(12) United States Patent
Maeda et al.

(10) Patent No.: US 9,812,682 B2
(45) Date of Patent: Nov. 7, 2017

(54) BATTERY PACK AND INDUSTRIAL VEHICLE

(71) Applicant: KABUSHIKI KAISHA TOYOTA JIDOSHOKKI, Aichi-ken (JP)

(72) Inventors: Kazuki Maeda, Kariya (JP); Takayuki Kato, Kariya (JP); Shintaro Watanabe, Kariya (JP); Hidefumi Oishi, Kariya (JP); Takashi Sakai, Kariya (JP); Yuki Chujo, Kariya (JP); Hiromi Ueda, Kariya (JP); Naoto Morisaku, Kariya (JP); Atsushi Yamaguchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 128 days.

(21) Appl. No.: 14/650,472

(22) PCT Filed: Dec. 5, 2013

(86) PCT No.: PCT/JP2013/082720
§ 371 (c)(1),
(2) Date: Jun. 8, 2015

(87) PCT Pub. No.: WO2014/092000
PCT Pub. Date: Jun. 19, 2014

(65) Prior Publication Data
US 2015/0318523 A1    Nov. 5, 2015

(30) Foreign Application Priority Data

Dec. 14, 2012   (JP) .................................. 2012-273570

(51) Int. Cl.
*H02J 7/00*       (2006.01)
*H02J 7/14*       (2006.01)
(Continued)

(52) U.S. Cl.
CPC ....... *H01M 2/1077* (2013.01); *B60L 11/1803* (2013.01); *B60L 11/1864* (2013.01);
(Continued)

(58) Field of Classification Search
USPC ............. 429/99, 149, 156, 100, 97, 158, 21; 320/107, 116, 134, 136, 109, 110, 118
See application file for complete search history.

(56) References Cited

U.S. PATENT DOCUMENTS

| | | | |
|---|---|---|---|
| 6,896,995 B2 * | 5/2005 | Saito ................... | H01M 2/1077 429/158 |
| 2003/0118898 A1 * | 6/2003 | Kimura ............... | H01M 2/0237 429/156 |

(Continued)

FOREIGN PATENT DOCUMENTS

| | | |
|---|---|---|
| EP | 0 662 725 | 7/1995 |
| EP | 2 883 730 | 6/2015 |

(Continued)

OTHER PUBLICATIONS

Extended European Search Report for EP Appl. No. 13 86 3158.5 dated Sep. 2, 2016.

(Continued)

*Primary Examiner* — Alexis Pacheco
(74) *Attorney, Agent, or Firm* — Greenblum & Bernstein, P.L.C.

(57) ABSTRACT

A battery pack includes a battery module including a plurality of rechargeable batteries, an electronic component that contributes to charging and discharging of the rechargeable batteries, and an installation body including an extending portion, which extends vertically. The installation body includes a placing portion, which projects from the extending portion in a direction crossing the vertical direction. At least one of the battery module and the electronic component (Continued)

is installed in the extending portion while being placed on the placing portion.

17 Claims, 4 Drawing Sheets

(51) Int. Cl.
```
H01M 2/10      (2006.01)
B66F 9/24      (2006.01)
B66F 9/075     (2006.01)
H01M 10/46     (2006.01)
B60L 11/18     (2006.01)
H01M 10/625    (2014.01)
H01M 10/613    (2014.01)
H01M 10/6562   (2014.01)
H01M 10/6555   (2014.01)
H01M 10/667    (2014.01)
```

(52) U.S. Cl.
CPC ....... *B60L 11/1874* (2013.01); *B60L 11/1877* (2013.01); *B60L 11/1879* (2013.01); *B66F 9/07554* (2013.01); *B66F 9/24* (2013.01); *H01M 2/1083* (2013.01); *H01M 10/46* (2013.01); *H01M 10/613* (2015.04); *H01M 10/625* (2015.04); *H01M 10/6562* (2015.04); *B60L 2200/42* (2013.01); *H01M 10/6555* (2015.04); *H01M 10/667* (2015.04); *H01M 2220/20* (2013.01); *Y02P 90/60* (2015.11); *Y02T 10/7005* (2013.01); *Y02T 10/7061* (2013.01)

(56) References Cited

U.S. PATENT DOCUMENTS

| | | | | |
|---|---|---|---|---|
| 2004/0129466 A1* | 7/2004 | Leifert | ..................... | B60K 1/04 180/65.25 |
| 2005/0162829 A1* | 7/2005 | Aker | .................. | H05K 7/20136 361/695 |
| 2008/0088276 A1* | 4/2008 | Hurst | ................ | H01M 10/0481 320/116 |
| 2009/0314557 A1* | 12/2009 | Takeuchi | .................. | B60K 1/04 180/65.1 |
| 2010/0247979 A1* | 9/2010 | Ha | ....................... | H01M 2/1077 429/7 |
| 2010/0301807 A1* | 12/2010 | Gamboa | ............. | H01M 2/0245 320/118 |
| 2011/0186365 A1* | 8/2011 | Abadia | ................. | B60L 3/0046 180/65.1 |
| 2012/0263984 A1 | 10/2012 | Krammer | | |
| 2013/0266838 A1* | 10/2013 | Von Borck | ................ | F28F 3/12 429/120 |
| 2014/0017528 A1* | 1/2014 | Uehara | ................. | H01M 2/202 429/61 |

FOREIGN PATENT DOCUMENTS

| | | |
|---|---|---|
| EP | 2 930 780 | 10/2015 |
| JP | 62-138761 | 9/1987 |
| JP | 9-163817 | 6/1997 |
| JP | 2011-54353 | 3/2011 |
| JP | 2011-124072 | 6/2011 |
| JP | 2012-202066 | 10/2012 |
| JP | 2012-216323 | 11/2012 |
| JP | 2013-105724 | 5/2013 |
| WO | 2011/073424 | 6/2011 |
| WO | 2012/028298 | 3/2012 |
| WO | 2012/132134 | 10/2012 |

OTHER PUBLICATIONS

Translation of International Preliminary Report on Patentability for PCT/JP2013/082720 dated Jun. 16, 2015.
Translation of Written Opinion of the International Searching Authority for PCT/JP2013/082720 dated Jan. 14, 2014.
Translation of International Search Report for PCT/JP2013/082720 dated Jan. 14, 2014.

* cited by examiner

BATTERY PACK AND INDUSTRIAL VEHICLE

TECHNICAL FIELD

The present invention relates to a battery pack, in which at least one of a battery module and an electronic component is installed in an installation body, and to an industrial vehicle including the battery pack.

BACKGROUND ART

An example of battery packs in which battery modules are installed in a vertically extending member is a rechargeable battery device disclosed in Patent Document 1. The rechargeable battery device of Patent Document 1 includes a plurality of layered cell assemblies. Each layered cell assembly includes a floor plate, a back plate extending vertically from the floor plate, and a base plate fixed on the floor plate. A battery module is placed on the base plate and contacts the back plate. Side plates are vertically arranged on the base plate to sandwich the battery module. A packing is arranged on the battery module, and another base plate is arranged on the packing. Another battery module is then placed on the base plate. In this way, the battery modules are layered.

PRIOR ART DOCUMENT

Patent Document

Patent Document 1: Japanese Laid-Open Patent Publication No. 2011-54353

SUMMARY OF THE INVENTION

Problem that the Invention is to Solve

When a battery module is installed in a vertically extending member, its weight may separate the battery module from the back plate. In a case that the back plate conducts heat generated by the battery module to cool the battery module, heat dissipation for the battery module may decline due to separation of the battery module from the back plate.

An objective of the present invention is to provide a battery pack and an industrial vehicle that limit the decrease of heat radiation performance.

Means for Solving the Problems

A battery pack for achieving the above objective includes a battery module including a plurality of rechargeable batteries, an electronic component that contributes to charging and discharging of the rechargeable batteries, and an installation body including an extending portion, which extends vertically. The installation body includes a placing portion, which projects from the extending portion in a direction crossing a vertical direction. At least one of the battery module and the electronic component is installed in the extending portion while being placed on the placing portion.

An industrial vehicle for achieving the above objective includes the above battery pack.

MODES FOR CARRYING OUT THE INVENTION

A battery pack according to one embodiment, which is mounted in a forklift, will now be described. In the following, the direction in which an operator of the forklift faces is defined as a forward direction. The backward, upward, downward, leftward, and rightward directions are defined with reference to the forward direction.

Figure 1:
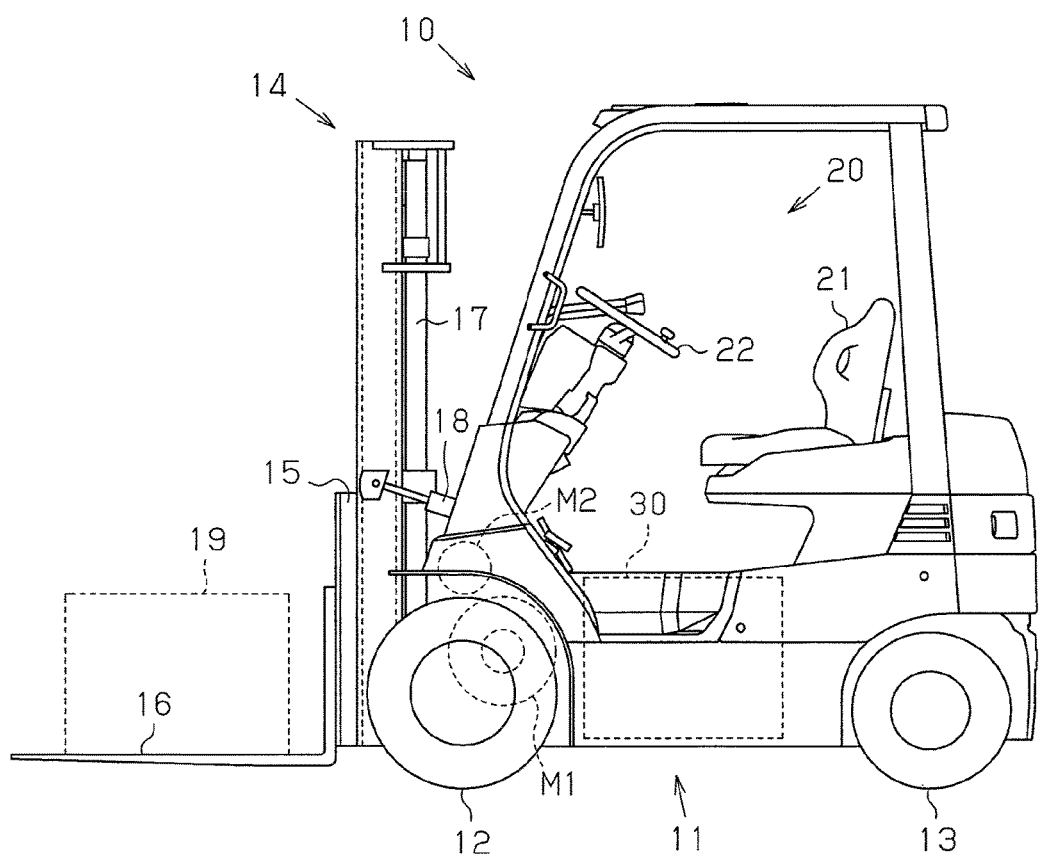
FIG. 1 is a schematic side view of a forklift including a battery pack according to an embodiment.

As shown in FIG. 1, a forklift 10 as an industrial vehicle includes a vehicle body 11, drive wheels 12, which are located in a lower front portion of the vehicle body 11, steerable wheels 13, which are located in a lower rear portion of the vehicle body 11, and a load handling device, which is located in front of the vehicle body 11. The load handling device includes a mast assembly 14, which is vertically arranged in front of the vehicle body 11, and a pair of forks 16, which is arranged side by side and attached to a mast assembly 14 via a lift bracket 15. The forks 16 move up and down with the lift bracket 15 by driving a lift cylinder 17, which is coupled to the mast assembly 14. The forks 16 tilt with the mast assembly 14 by driving a tilt cylinder 18, which is coupled to the mast assembly 14. A load 19 is loaded onto the forks 16. A motor M1 for traveling and a motor M2 for handing a load are mounted to the vehicle body 11. The motor M1 is a drive source of the drive wheels 12. The motor M2 is a drive source of the forks 16.

An operator cab 20 is arranged in the center of the vehicle body 11. An operator seat 21 is arranged in the operator cab 20, and a worker (an operator) sits on the operator seat 21. A steering wheel 22 is arranged in front of the operator seat 21. A battery pack 30 is mounted below the operator cab 20. The battery pack 30 will now be described in detail.

Figure 2:
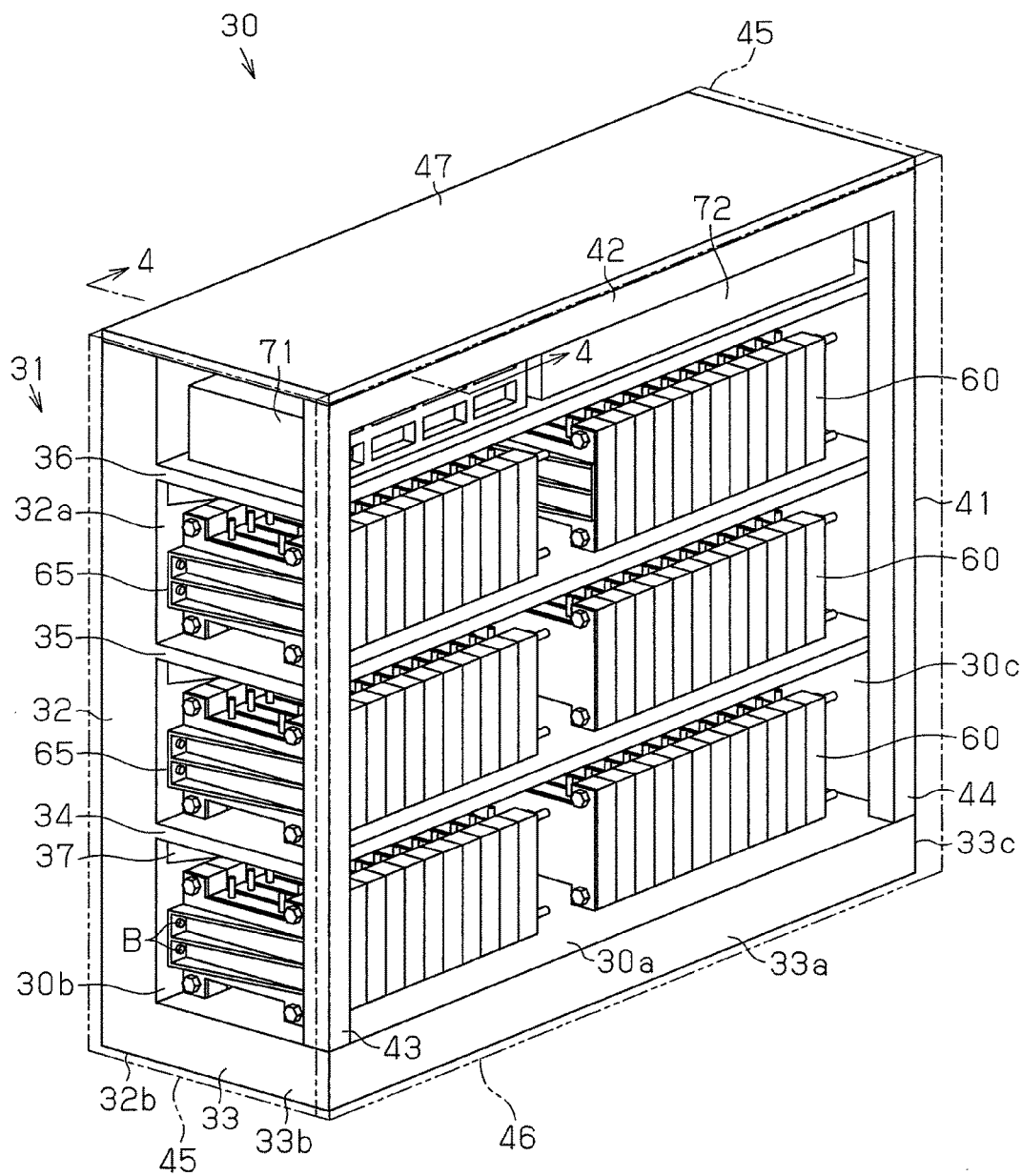
FIG. 2 is a perspective view of the battery pack according to the embodiment.

As shown in FIG. 2, the battery pack 30 includes a counterweight 31 as an installation body to counterbalance the load 19, which is mounted on the forks 16. The counterweight 31 includes a weight body 32 as an extending portion, which extends vertically. The weight body 32 is shaped like a rectangular plate. A first placing portion 33, a second placing portion 34, a third placing portion 35, and a fourth placing portion 36 project in the thickness direction of the weight body 32 and from a face 32a orthogonal to the thickness direction of the weight body 32. These placing portions 33-36 are spaced from one another in the transverse direction of the weight body 32, i.e., in the vertical direction. Each of the placing portions 33-36 projects from the weight body 32 in a direction crossing the vertical direction, which is the horizontal direction in the present embodiment. The first placing portion 33 is arranged on a first end 32b in the transverse direction of the weight body 32. In other words, the first placing portion 33 extends from the basal end of the weight body 32 in the thickness direction of the weight body 32.

Each of the placing portions 33-36 is shaped like a rectangular plate and extends along the entire length of the weight body 32. Each of the placing portions 33-36 has a longitudinal direction that coincides with the longitudinal direction of the weight body 32 and a transverse direction that coincides with its projecting direction from the face 32a. The first placing portion 33 is thicker than the other placing portions 34-36. The transverse dimension of the first placing portion 33 is slightly longer than the transverse dimensions of the other placing portions 34-36. Each of the placing portions 33-36 is formed by a process such as casting to be integrated with the weight body 32. In the present embodiment, the counterweight 31 is made of metal such as iron.

Figure 3:
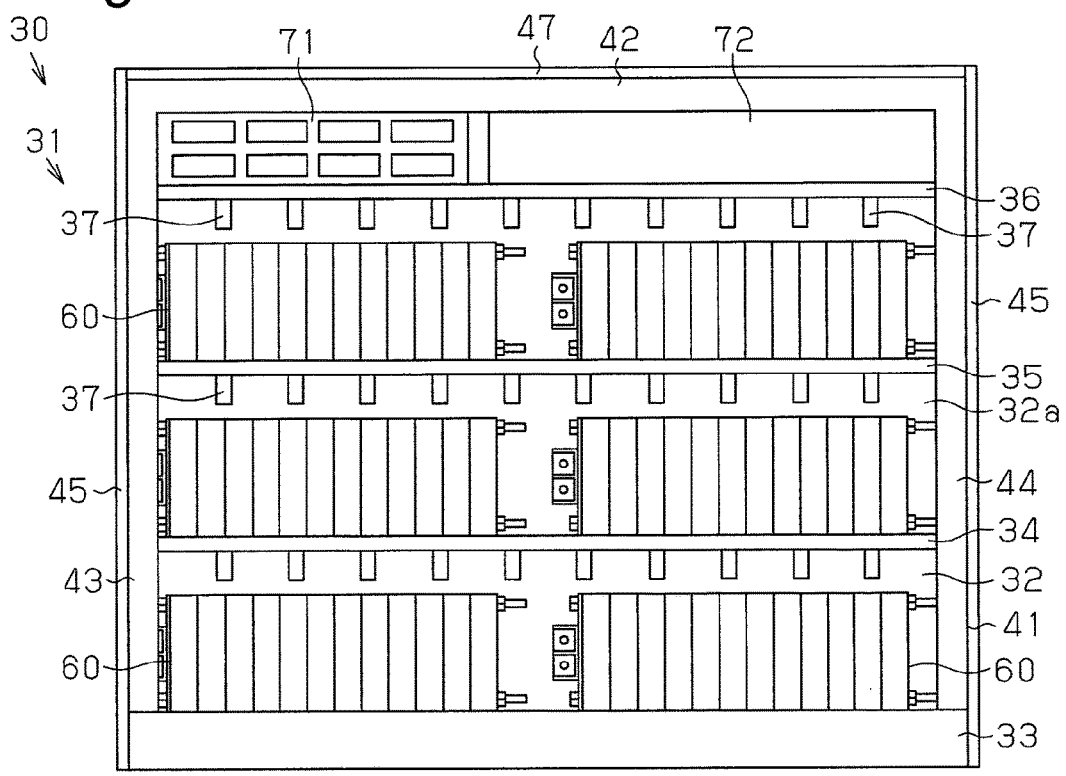
FIG. 3 is a front view of the battery pack of FIG. 2.
Figure 4:
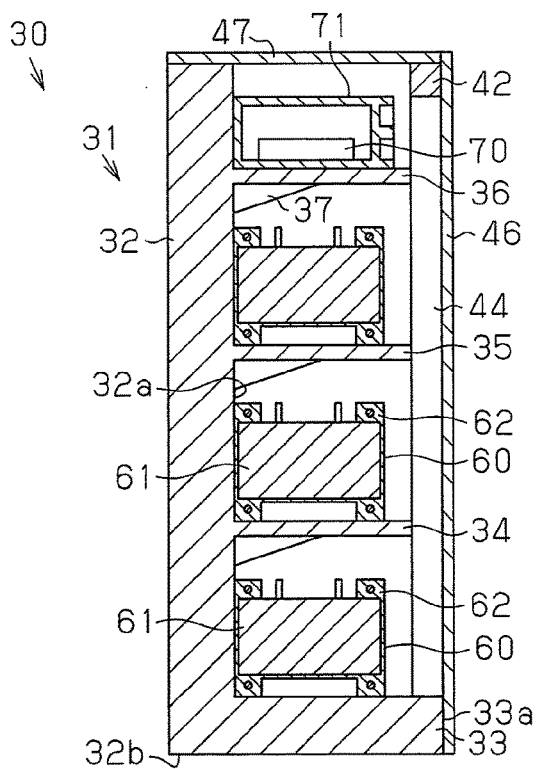
FIG. 4 is a cross-sectional view taken along line 4-4 of FIG. 2.

As shown in FIGS. 3 and 4, each of the placing portions 34-36 is provided with ribs 37, which are arranged on the underside in the vertical direction. Each rib 37 is a plate-like member, which is shaped like a right triangle as viewed from the side, and has a right angled portion located at the corner formed by the face 32a of the weight body 32 and the bottom of the corresponding one of the placing portions 34-36.

As shown in FIG. 2, the first placing portion 33 has a first end (the basal end) in the transverse direction connected to the weight body 32 and a second end 33a (the distal end) in the transverse direction opposite to the first end. A substantially inverted U shaped frame 41 is vertically arranged from the first placing portion 33 at the transverse second end 33a to be separated from the weight body 32. The frame 41 includes a first pole 43 and a second pole 44, which are vertically arranged from the two corners of the transverse second end 33a on the top of the first placing portion 33. The frame 41 further includes a base 42, which connects the upper ends of the first pole 43 and the second pole 44 (the ends opposite to ends joined to the first placing portion 33). As a result, the battery pack 30 has a front opening 30a, which is located on a side close to the transverse second end 33a of the first placing portion 33 and surrounded by the first placing portion 33 and the frame 41. The front opening 30a is closed by a cover 46, which is shaped like a rectangular plate.

Each pole 43 or 44 has a length in the standing direction (the longitudinal dimension of the pole) that is the same as the shortest distance from the top of the first placing portion 33 to the face at the distal end of the weight body 32 (the end opposite to the basal end of the weight body 32). A top plate 47 is supported on the top of the frame 41 and the top of the weight body 32. The top plate 47 closes an opening (not shown) between the weight body 32 and the frame 41. The battery pack 30 further has a first opening 30b, which is located in a first lateral portion that corresponds to a longitudinal first end 33b of the first placing portion 33. The first opening 30b is surrounded by the weight body 32, the first placing portion 33, the first pole 43, and the top plate 47. The battery pack 30 also has a second opening 30c, which is located in a second lateral portion that corresponds to a longitudinal second end 33c of the first placing portion 33. The second opening 30c is surrounded by the weight body 32, the first placing portion 33, the second pole 44, and the top plate 47. The first opening 30b and the second opening 30c are closed by covers 45.

A plurality of battery modules 60 is arranged on the face 32a of the weight body 32. The first placing portion 33, the second placing portion 34, and the third placing portion 35 each carry two battery modules 60.

Figure 5:
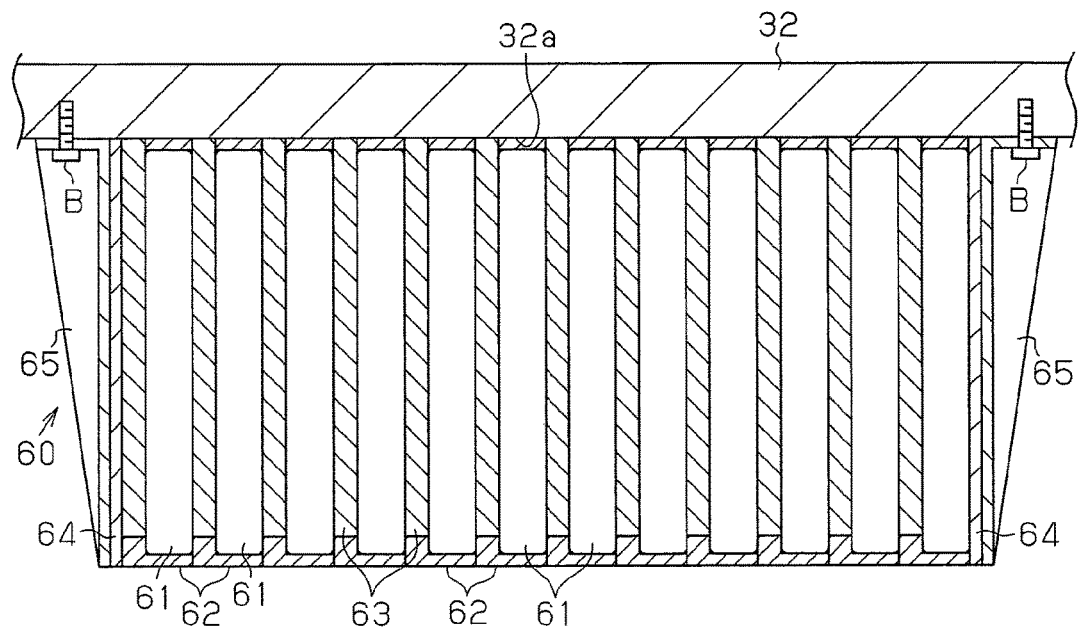
FIG. 5 is a cross-sectional view of a battery module in the battery pack of FIG. 2.

As shown in FIG. 5, each battery module 60 includes rectangular batteries 61 as rechargeable batteries (e.g., lithium ion rechargeable batteries and nickel-metal hydride batteries). The batteries 61 are arranged side by side and held by a battery holder 62. A heat transfer plate 63 is placed between each pair of adjacent rectangular batteries 61. The battery module 60 is provided with end plates 64 on the opposite ends in the arrangement direction of the rectangular batteries 61.

Each end plate 64 has an outer face (a face opposite to a face that faces the battery module 60), to which a bracket 65 is fixed. A bolt B, which is inserted in and passes through the bracket 65, is screwed to the weight body 32 to install the battery module 60, which is thermally coupled to the weight body 32.

As shown in FIGS. 3 and 4, a housing case 71 and a junction box 72 are fixed to the fourth placing portion 36. The housing case 71 accommodates a controller 70 (e.g., an inverter) for controlling the battery modules 60. The junction box 72 accommodates relays, wires, and the like. The controller 70 is an electronic component, which, for example, converts direct current power into alternating current power in discharge of the rectangular batteries 61. The relays and the wires are electronic components, which, for example, switch between connection and disconnection with an external power source during charging of the rectangular batteries 61. In other words, these components contribute to charging and discharging of the rectangular batteries 61 (the rechargeable batteries). These electronic components, which are accommodated in the housing case 71 and the junction box 72, are installed in the weight body 32.

Operation of the battery pack 30 according to the present embodiment will now be described.

The first placing portion 33, the second placing portion 34, and the third placing portion 35 each carry the corresponding battery modules 60, which are joined to the weight body 32. The battery modules 60 receive vertically downward force that results from the force of gravity. However, the battery modules 60 are difficult to be separated from the weight body 32 since each of the placing portions 33-35 supports the vertically lower portions of the corresponding battery modules 60.

The battery modules 60 contact not only the weight body 32 but also the respective placing portions 33-35. This increases the contact area between the counterweight 31 and the battery modules 60.

When heat is generated in the battery modules 60, air (heat medium) surrounding the battery modules 60 is heated and moves vertically upward. At this time, the circulation of the heated air is blocked by each of the placing portions 34-36. This limits the direct supply of the heated air to the battery modules 60 and the electronic components that are located in a vertically upper part. Thus, the individual pieces of the battery modules 60 and the electronic components are not easily affected by one another.

The fourth placing portion 36 carries the electronic components that contribute to charging and discharging of the rectangular batteries 61. When the electronic components generate heat, the heat is transferred to the weight body 32 and the fourth placing portion 36. Thus, the fourth placing portion 36 has a similar function to those of the other placing portions 33-35.

Accordingly, the above illustrated embodiment achieves the following advantages.

(1) The vertically lower portions of the battery modules 60, the housing case 71, and the junction box 72 are supported by the respective placing portions 33-36. Thus, each member is difficult to be separated from the weight body 32. This improves the joining strength of the weight body 32 with the battery modules 60, the housing case 71, and the junction box 72. Thus, the joining condition between the weight body 32 and each member is maintained to limit the decrease in the heat radiation performance for the battery modules 60 and the electronic components.

(2) The placing portions 33-36 are provided to increase the contact area of the counterweight 31 with the battery modules 60, the housing case 71, and the junction box 72. This improves the heat radiation performance for the battery modules 60 and the electronic components.

(3) The battery modules 60, which are supported by the placing portions 33-35, are difficult to be separated from the weight body 32. Thus, the force needed for fixing the battery modules 60 to the weight body 32 is less than the force in the case without the placing portions 33-35. This allows downsizing of the bracket 65, which is used for fixing the battery modules 60 to the weight body 32. As a result, the battery pack 30 is downsized in whole.

(4) The placing portions 33-36 limit the direct supply of heated air to the battery modules 60 and the electronic components that are located in a vertically upper part. Thus, the battery modules 60 and the electronic components are difficult to be heated so that the deterioration of the rectangular batteries 61 and the electronic components is suppressed.

(5) The ribs 37 are arranged on the bottoms in the vertical direction of the second placing portion 34, the third placing portion 35, and the fourth placing portion 36. This improves the strength of the second placing portion 34, the third placing portion 35, and the fourth placing portion 36. The strength of the placing portions 34-36 is improved so that desired strength is obtained even if the thicknesses of the placing portions 34-36 are decreased. When the thicknesses of the placing portions 34-36 are decreased, the material cost is reduced, and the battery pack 30 is downsized. The desired strength of the placing portions 34 to 36 is defined as a strength that prevents the placing portions 34 to 36, which carry the battery modules 60, the housing case 71, and the junction box 72, from being deformed over time to an extent that affects charging and discharging of the rectangular batteries 61.

(6) The ribs 37 are provided so that the surface area of the counterweight 31 is increased. This improves the heat radiation performance for the battery modules 60 and the electronic components since the ribs 37 also function as fins.

(7) The placing portions 33-36 are integrated with the weight body 32. When the placing portions 33-36 and the weight body 32 are formed separately, the thermal resistance is increased in the interface between the weight body 32 and each of the placing portions 33-36. This decreases the heat radiation performance for the battery modules 60 and the electronic components. When the placing portions 33-36 and the weight body 32 are integrated, the heat radiation performance is improved for the battery modules 60 and the electronic components.

(8) The counterweight 31 is used as an installation body. Using the counterweight 31, which is originally mounted in the forklift 10, as an installation body eliminates the need for preparing an additional installation body. This limits the increase in the number of components.

The above illustrated embodiment may be modified in the following forms.

Figure 6:
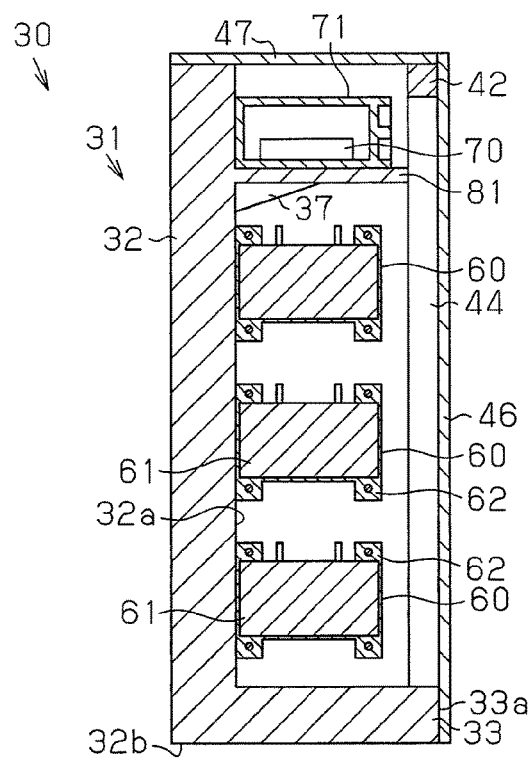
FIG. 6 is a cross-sectional view of a modified battery pack.

As shown in FIG. 6, the battery modules 60 may be joined to the weight body 32 without being placed on placing portions. In other words, only the electronic components (the housing case 71 and the junction box 72) may be placed on a placing portion 81. Alternatively, the battery modules 60 and the electronic components may be joined to the weight body 32 while only the battery modules 60 are placed on placing portions without placing the electronic components on a placing portion. In other words, the battery modules 60 and the electronic components may be joined to the weight body 32 while at least one group of the battery modules 60 and the electronic components is placed on a placing portion.

A member other than the weight body 32 of the counterweight 31 may be used as an installation body. For example, when the battery pack 30 is formed by fixing the battery modules 60 to a housing, the housing may be used as an installation body, and a placing portion may be formed on a vertically extending lateral wall of the housing.

The placing portions 33-36 each may have any shape. Similarly, the weight body 32 may have any shape. Examples of the shapes include a circular shape and a polygonal shape such as a triangle and a rectangle as viewed from above.

Each of the placing portions 33-36 may be formed separately from the weight body 32. In this case, the placing portion is fixed to the weight body 32, e.g., by fastening a bolt or with an adhesive.

The ribs 37 may have another shape such as a rectangle as viewed from the side.

If the desired strength is obtained without providing the ribs 37, the ribs 37 may be omitted.

Batteries other than the rectangular batteries 61 such as cylindrical batteries or laminated batteries may be used as rechargeable batteries.

The rectangular batteries 61 may be held without the battery holder 62. In other words, the battery holder 62 may be omitted in the battery module 60. The heat transfer plates 63 may be omitted in the battery module 60.

As long as each of the placing portions 33-36 projects from the weight body 32 in a direction crossing the vertical direction, the placing portions 33-36 may be slightly inclined vertically upward or downward at an angle at which the battery module 60 and the electronic components are allowed to be placed.

A counterweight provided for an excavator (an industrial vehicle) may be used as an installation body.

What is claimed is:

1. A battery pack comprising:
a first battery module including a plurality of rechargeable batteries;
a first electronic component configured to charge and discharge the rechargeable batteries; and
an installation body made of metal and including:
an extending portion, which extends in a vertical direction; and
a placing portion, which projects from the extending portion in a direction crossing the vertical direction, wherein
at least one of the first battery module and the first electronic component is installed on and thermally coupled to the extending portion and a surface of the at least one of the first battery module and the first electronic component that faces downward in the vertical direction is placed on and thermally coupled to a surface of the placing portion that faces upward in the vertical direction,
at least one of a second battery module and a second electronic component is arranged at an underside in the vertical direction of the placing portion and is joined to the extending portion,
the placing portion is vertically spaced from the at least one of the second battery module and the second electronic component, and
the extending portion and the placing portion are integral.

2. The battery pack according to claim 1, wherein
a rib is arranged on the underside in the vertical direction of the placing portion to support the placing portion, and
the rib is vertically spaced from the at least one of the second battery module and the second electronic component.

3. A battery pack comprising:
a battery module including a plurality of rechargeable batteries;
an electronic component configured to charge and discharge the rechargeable batteries; and
an installation body made of metal and including:
an extending portion, which extends in a vertical direction; and
a plurality of placing portions, which project from the extending portion in a direction crossing the vertical direction, wherein
at least one of the battery module and the electronic component is installed on and thermally coupled to the extending portion and a surface of the at least one of the battery module and the electronic component that faces downward in the vertical direction is placed on and thermally coupled to a surface of one of the placing portions that faces upward in the vertical direction, and
the extending portion and the placing portions are integral.

4. The battery pack according to claim 1, wherein the installation body is a counterweight mounted in an industrial vehicle.

5. An industrial vehicle comprising the battery pack according to claim 1.

6. The battery pack according to claim 3, wherein the installation body is a counterweight mounted in an industrial vehicle.

7. An industrial vehicle comprising the battery pack according to claim 3.

8. The battery pack according to claim 1, wherein
the placing portion projects from the extending portion in a direction perpendicular to the vertical direction,
the at least one of the first battery module and the first electronic component installed on the extending portion and placed on the placing portion projects from the extending portion in the direction perpendicular to the vertical direction, and
the placing portion projects farther from the extending portion than the at least one of the first battery module and the first electronic component in the direction perpendicular to the vertical direction.

9. The battery pack according to claim 3, wherein
the placing portions project from the extending portion in a direction perpendicular to the vertical direction,
the at least one of the battery module and the electronic component installed on the extending portion and placed on the one of the placing portions projects from the extending portion in the direction perpendicular to the vertical direction, and
each of the placing portions project farther from the extending portion than the at least one of the battery module and the electronic component in the direction perpendicular to the vertical direction.

10. The battery pack according to claim 1, wherein
a rib is arranged on the underside in the vertical direction of the placing portion to support the placing portion,
the extending portion includes a vertical surface from which the placing portion projects,
the placing portion includes a bottom surface, and
the rib is located at a corner defined by the vertical surface of the extending portion and the bottom surface of the placing portion.

11. The battery pack according to claim 3, wherein
a rib is arranged on an underside in the vertical direction of each placing portion to support each placing portion,
the extending portion includes a vertical surface from which the placing portions project,
each placing portion includes a bottom surface, and
each rib is located at a respective corner defined by the vertical surface of the extending portion and the bottom surface of the respective placing portion.

12. The battery pack according to claim 1, wherein
the extending portion includes a vertical surface, and the placing portion projects from the vertical surface in a direction perpendicular to the vertical surface and extends in a horizontal direction along the vertical surface.

13. The battery pack according to claim 3, wherein
the extending portion includes a vertical surface, and the placing portion projects from the vertical surface in a direction perpendicular to the vertical surface and extends in a horizontal direction along the vertical surface.

14. The battery pack according to claim 12, wherein
the rechargeable batteries of the battery module are arranged in the horizontal direction along the vertical surface.

15. The battery pack according to claim 13, wherein
the rechargeable batteries of the battery module are arranged in the horizontal direction along the vertical surface.

16. The battery pack according to claim 14, wherein
end plates are provided on opposite ends of the battery module in the horizontal direction along the vertical surface, and the end plates are fastened to the vertical surface with brackets.

17. The battery pack according to claim 15, wherein
end plates are provided on opposite ends of the battery module in the horizontal direction along the vertical surface, and the end plates are fastened to the vertical surface with brackets.

* * * * *